Oct. 18, 1932.  O. C. ROESEN  1,882,932
TENSION METER
Filed May 25, 1929  2 Sheets-Sheet 1

Inventor
Oscar C. Roesen.

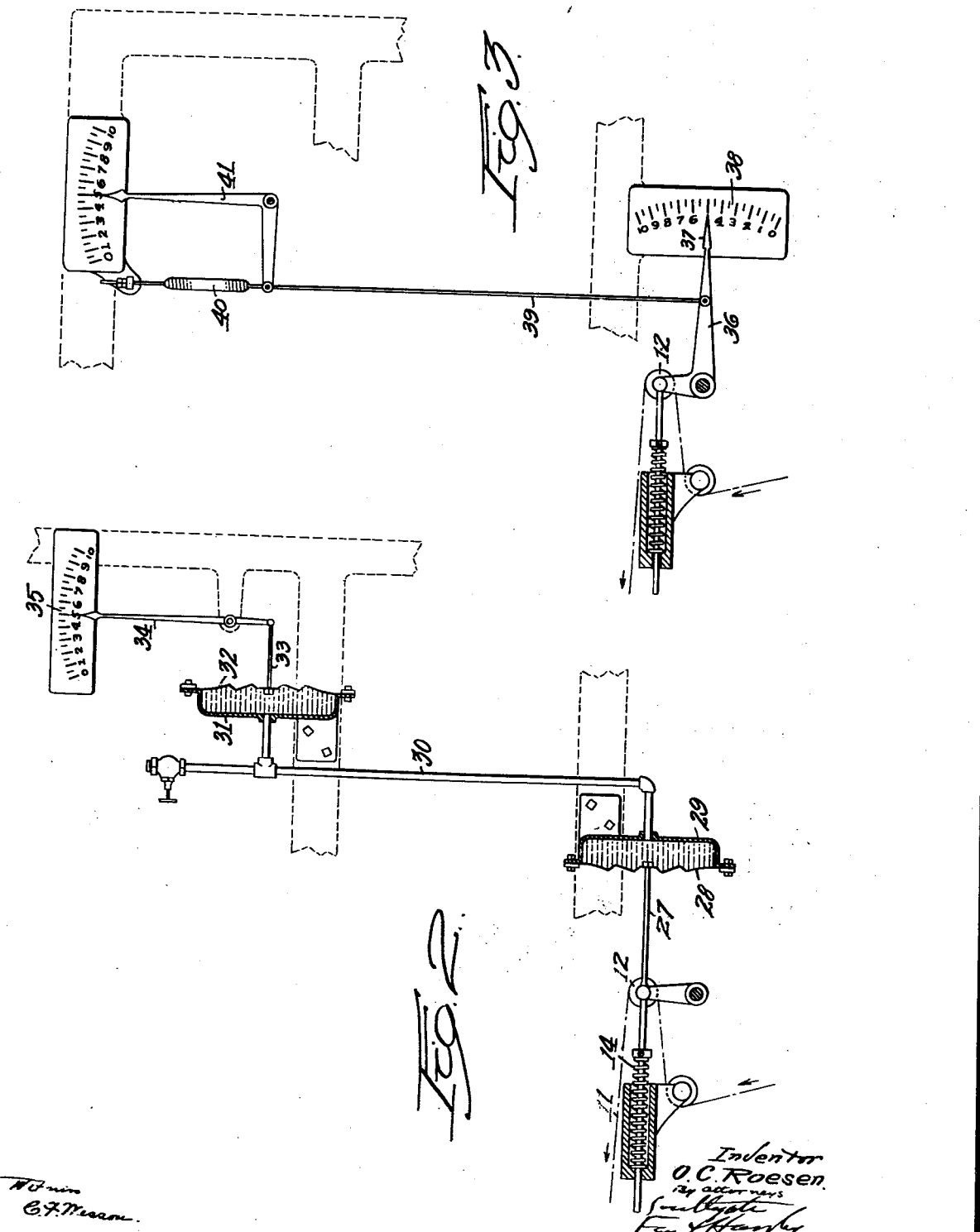

Patented Oct. 18, 1932

1,882,932

UNITED STATES PATENT OFFICE

OSCAR CHARLES ROESEN, OF BROOKLYN, NEW YORK, ASSIGNOR TO WOOD NEWSPAPER MACHINERY CORPORATION, OF NEW YORK, N. Y., A CORPORATION OF VIRGINIA

TENSION METER

Application filed May 25, 1929. Serial No. 365,995.

This invention relates to a device for measuring and indicating the tension of a web of paper or other material.

The principal objects of the invention are to provide means whereby an increase or decrease in the tension of the web will be transmitted to an indicator which will show by its position the amount of tension; to provide means whereby when the tension gets dangerously high a signal will be given automatically and to provide a plurality of ways in which the degree of tension can be transmitted to the indicator.

Other objects and advantages of the invention will appear hereinafter.

Reference is to be had to the accompanying drawings in which

Fig. 2 is a similar view showing the transmission of the motion of the roll to the indicator hydraulically, and Fig. 3 is a similar view showing mechanical operation.

Figure 1:
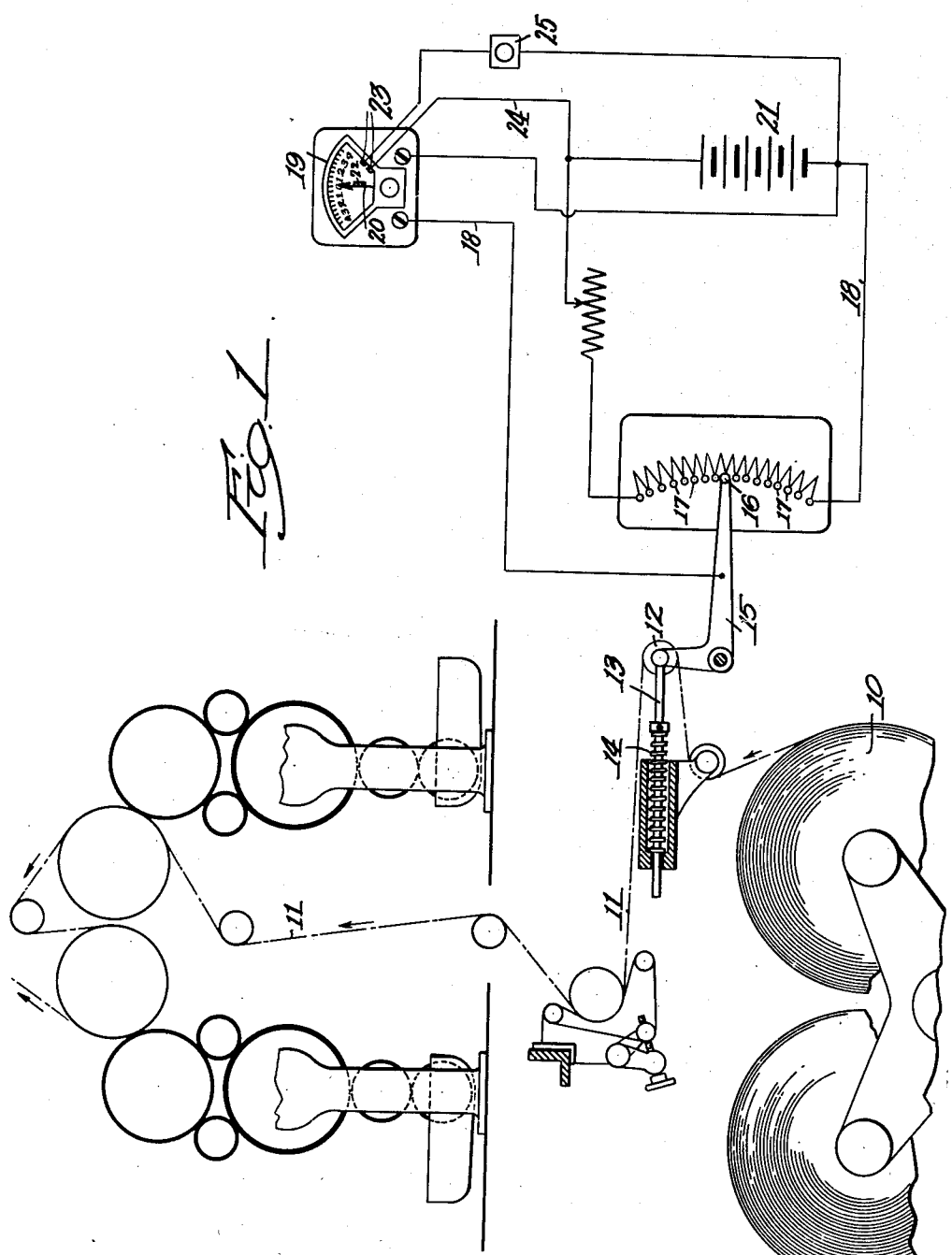
Fig. 1 is a diagrammatic view showing the end of a printing press, the means for feeding the paper thereto, the tension roll and a preferred arrangement for showing on the indicator the position of the tension roll.

Referring first to Fig. 1 it will be seen that the invention is illustrated as applied to an ordinary printing press unit and that a web roll 10 is shown as applying a web of paper 11 to the press. The paper passes over a tension roll 12, the shaft of which is supported at opposite ends by rods 13 which are pressed by springs 14 so that the roll will take up the slack and apply tension to the web.

By means of a bell crank 15 the movement of the roll is translated to a contact 16 on the end of this arm to move it over a series of electrical contacts 17, constituting a rheostat, located in a circuit 18. In this circuit is located an indicator 19 and the pointer 20 is moved over the dial of the indicator in accordance with the strength of the current transmitted through this circuit. The current from the battery 21 is dependent upon the resistance and consequently the position of the contact 16 will determine it.

If the roll 12 is pressed too far back against its springs by the tension of the web the contact 16 will go further up on the rheostat and allow more current to flow through the circuit 18. Eventually a contact 22 on the pointer 20 will engage a pair of spaced contacts 23 in another circuit 24 in which the battery 21 is also located. This will cause a bell or other alarm 25 to be sounded or a lamp to be energized as the case may be. In this way the pressman upstairs as well as the reelman downstairs knows when the tension is dangerously high and they can act accordingly.

This is useful also to indicate to the pressman when the web supply roll 10 is eccentric. This, of course, will be evidenced by sharp fluctuations of the pointer. When the pointer vibrates this serves as a warning against attempting to reach speeds that are too high. Such high speeds would cause web breaks and consequent delays when using an uneven paper roll 10.

In the form shown in Fig. 2 the same results are secured by hydraulic means. In this case the shaft of the roll 12 is connected by a rod 27 to a diaphragm 28 which is fixed to a casing 29. In this casing, behind the diaphragm, is a liquid as for example, oil or water. The interior is connected by a pipe 30 with a similar casing 31 and diaphragm 32. The pipe 30 extends high enough so that both casings can be kept filled with the liquid. Under severe tension the roll 12 will be forced back and move the diaphragm 28 with it, which also will pull in the diaphragm 32 in an obvious manner.

The diaphragm 32 is connected by a rod 33 to a pointer 34 to cooperate with a dial 35 to constitute an indicator. No alarm is shown in connection with this.

In the form shown in Fig. 3 the same results are secured by mechanical means entirely. In this case the shaft of the roll 12 is connected with a lever 36 shown in the form of a bell crank and having directly thereon a pointer 37 cooperating with a scale 38 to show the reelman the condition of the tension. The pointer 36 is also connected by a rod 39 pulled back by a spring 40 and connected with a pointer 41. This pointer is located upstairs where the pressman can also observe the conditions.

In all three forms the varying pulls on the web cause varying compressions of the tension springs and the indicators show the situation as to tension at a glance. This is of importance to enable the operators to slow down the press if the tension is getting too high and thus prevent breaks and also for showing when an eccentric web roll is being used. In the form shown in Fig. 1 an additional signal is operated as has been stated.

Although I have illustrated and described only three forms of the invention I am aware of the fact that other modifications can be made therein by any person skilled in the art without departing from the scope of the invention as expressed in the claims.

Therefore, I do not wish to be limited in this respect but what I do claim is:—

1. The combination with a spring-pressed web roll, of an arm connected with the web roll to move therewith, a rheostat, means connected with the arm for moving over the contacts of the rheostat in accordance with the position of the roll due to its tension, a circuit connected to the rheostat and an indicator in said circuit having a pointer adapted to move over the scale of the indicator in accordance with the amount of current passing through the circuit whereby the position of said means on the rheostat will control the position of the pointer on the indicator, a second electric circuit having a pair of contacts adapted to be closed by the pointer when it reaches an extreme position and a signal in the second circuit adapted to be energized on the closing of said contact.

2. The combination with a web tension roll and yielding means for supporting it in opposition to the tension of the web, of a pair of casings each having a diaphragm, one of said diaphragms being connected with said roll to move back and forth therewith, said casings being filled with liquid, an indicator having a scale and a pointer movable over said scale and connected with the second diaphragm.

3. The combination with a spring-pressed web tension roll, of a pointer connected with the roll to be moved thereby, a scale over which said pointer is adapted to move to indicate the tension on the roll, a link connected to said pointer, yielding means urging said link in a direction opposite to that in which it is moved by the first named springs and a second pointer connected with the link at a distance from the first pointer and having a scale indicating the same thing as the first named scale.

4. The combination with means for supplying a web to a machine, of a spring-pressed tension roll located in a loop in the web, the spring thereof operating against the tension of the web, an indicator at a distance from said roll, means for operating the indicator, and means directly connected with said roll for controlling the operation of said operating means.

In testimony whereof I have hereunto affixed my signature.

OSCAR CHARLES ROESEN.